(12) United States Patent
Strein et al.

(10) Patent No.: US 12,289,369 B2
(45) Date of Patent: Apr. 29, 2025

(54) SOFTWARE DEFINED NETWORK ORCHESTRATION TO MANAGE MEDIA FLOWS FOR BROADCAST WITH PUBLIC CLOUD NETWORKS

(71) Applicant: Disney Enterprises, Inc., Burbank, CA (US)

(72) Inventors: Michael J. Strein, Bohemia, NY (US); Ryan N. McCormick, Blauvelt, NY (US); Craig L. Beardsley, Chicago, IL (US)

(73) Assignee: Disney Enterprises, Inc., Burbank, CA (US)

( * ) Notice: Subject to any disclaimer, the term of this patent is extended or adjusted under 35 U.S.C. 154(b) by 1 day.

(21) Appl. No.: 17/815,147

(22) Filed: Jul. 26, 2022

(65) Prior Publication Data
US 2022/0360559 A1 Nov. 10, 2022

Related U.S. Application Data

(62) Division of application No. 16/800,853, filed on Feb. 25, 2020, now Pat. No. 11,470,041.
(Continued)

(51) Int. Cl.
| | |
|---|---|
| *H04L 67/1097* | (2022.01) |
| *G06F 9/455* | (2018.01) |
| *G06F 9/50* | (2006.01) |
| *H04L 9/40* | (2022.01) |
| *H04L 12/18* | (2006.01) |

(Continued)

(52) U.S. Cl.
CPC ........ *H04L 67/1097* (2013.01); *G06F 9/455* (2013.01); *G06F 9/45533* (2013.01); *G06F 9/5011* (2013.01); *H04L 12/1868* (2013.01); *H04L 12/1886* (2013.01); *H04L 41/04* (2013.01); *H04L 41/069* (2013.01); *H04L 41/342* (2022.05); *H04L 41/40* (2022.05); *H04L 43/04* (2013.01); *H04L 43/062* (2013.01); *H04L 47/82* (2013.01); *H04L 63/0236* (2013.01); *H04L 65/1016* (2013.01); *H04L 65/60* (2013.01); *H04L 65/611* (2022.05); *H04L 65/65* (2022.05); *H04L 65/70* (2022.05); *H04L 65/762* (2022.05); *H04L 67/10* (2013.01); *H04L 69/04* (2013.01); *H04N 21/26616* (2013.01); *H04N 21/6405* (2013.01); *H04N 21/6408* (2013.01); *H04L 63/0428* (2013.01)

(58) Field of Classification Search
CPC ......... H04L 65/611; H04L 43/04; H04L 65/60
See application file for complete search history.

(56) References Cited

U.S. PATENT DOCUMENTS

| | | | |
|---|---|---|---|
| 8,392,350 B2 * | 3/2013 | Brooks | G06Q 30/0643 706/45 |
| 2006/0248213 A1 * | 11/2006 | Sherer | H04L 65/611 709/231 |

(Continued)

*Primary Examiner* — Ryan J Jakovac
(74) *Attorney, Agent, or Firm* — Farjami & Farjami LLP

(57) ABSTRACT

Techniques to manage media flows for broadcast with public cloud networks. A request for a media flow is received. A location of the media flow is identified based on a registration database configured to maintain locations of media flows across a media production facility and a public cloud network facility. The media flow is accessed, and at least one of the receiving entity or the requesting entity is configured to generate media based on the media flow.

17 Claims, 7 Drawing Sheets

Related U.S. Application Data

(60) Provisional application No. 62/864,279, filed on Jun. 20, 2019.

(51) Int. Cl.

| | | |
|---|---|---|
| *H04L 41/04* | (2022.01) | |
| *H04L 41/069* | (2022.01) | |
| *H04L 41/342* | (2022.01) | |
| *H04L 41/40* | (2022.01) | |
| *H04L 43/04* | (2022.01) | |
| *H04L 43/062* | (2022.01) | |
| *H04L 47/70* | (2022.01) | |
| *H04L 65/1016* | (2022.01) | |
| *H04L 65/60* | (2022.01) | |
| *H04L 65/611* | (2022.01) | |
| *H04L 65/65* | (2022.01) | |
| *H04L 65/70* | (2022.01) | |
| *H04L 65/75* | (2022.01) | |
| *H04L 67/10* | (2022.01) | |
| *H04L 69/04* | (2022.01) | |
| *H04N 21/266* | (2011.01) | |
| *H04N 21/6405* | (2011.01) | |
| *H04N 21/6408* | (2011.01) | |

(56) References Cited

U.S. PATENT DOCUMENTS

| | | | |
|---|---|---|---|
| 2010/0122305 A1* | 5/2010 | Moloney | G06Q 30/00 725/54 |
| 2014/0372624 A1* | 12/2014 | Wang | H04L 12/189 709/231 |
| 2016/0073176 A1* | 3/2016 | Phillips | H04N 21/23418 725/35 |
| 2017/0289228 A1* | 10/2017 | Romrell | H04N 21/25883 |
| 2017/0339201 A1* | 11/2017 | Dettori | H04L 65/61 |
| 2017/0353744 A1* | 12/2017 | Kunisetty | H04N 21/23109 |
| 2018/0098242 A1* | 4/2018 | Thienot | H04L 65/70 |
| 2018/0262551 A1* | 9/2018 | Demeyer | H04L 65/80 |
| 2020/0077161 A1* | 3/2020 | Lohmar | H04L 65/762 |
| 2020/0252792 A1* | 8/2020 | Amin | H04L 9/0833 |

* cited by examiner

SOFTWARE DEFINED NETWORK ORCHESTRATION TO MANAGE MEDIA FLOWS FOR BROADCAST WITH PUBLIC CLOUD NETWORKS

CROSS-REFERENCE TO RELATED APPLICATIONS

This application is a divisional of U.S. patent application Ser. No. 16/800,853 filed on Feb. 25, 2020, which claims benefit of U.S. provisional patent application Ser. No. 62/864,279, filed Jun. 20, 2019. Each of the aforementioned related patent applications are herein incorporated by reference in their entirety.

BACKGROUND

As used herein, "unicast" describes communications where a piece of information is sent from one point to another point. In a unicast transmission there is only one sender and one receiver. Unicast transmission in an Internet Protocol (IP) based network, in which a packet is sent from a single source to a specified destination, is a predominant form of transmission on Local Area Networks (LANs) and within the Internet. All LANs (e.g., Ethernet) and IP networks support the unicast transfer mode, such as the standard unicast applications (e.g., HTTP, SMTP, FTP and TELNET), which employ TCP (Transmission Control Protocol).

As used herein, "multicast" describes communications where a piece of information is sent from a first set of one or more points to a second set of points to a receiver set, which any number of receivers can elect to join. In IP based networks, there may be one or more senders, and the information is distributed to a set of zero or more receivers (i.e., there may be no receivers, or any other number of receivers.) Multicasting is the networking technique of delivering the same packet simultaneously to a group of clients. The format of an IP multicast packet is identical to that of unicast packets and is distinguished by the use of a special class of destination address (e.g., class D IPv4 addresses), which denotes a specific multicast group. In some cases, a multicast communication can be sent from a single sender to a receiver set including a single receiver, but is differentiable from a unicast message based on the message being addressed to the receiver set (via a multicast group identifier) instead of being addressed to the individual receiver (via an IP address). Since TCP supports only the unicast mode, multicast applications must use another protocol, such as the User Datagram Protocol (UDP) transport protocol. Unlike broadcast transmission (which is used on some local area networks), multicast clients receive a stream of packets only if those clients have previously elected to do so by joining the specific multicast group address. Membership of a group is dynamic and controlled by the receivers (which is in turn informed by the local client applications).

Media-over-Internet Protocol, or media-over-IP, production facilities typically rely on multicast flow distribution to efficiently move media content, for which there are established production media flow carriage and management standards, as well as proprietary solutions. In traditional media-over-IP production environments, these standards and solutions for managing multicast production media flows are implemented using "on premises" resources for which the production facility has control of the information technology (IT) architecture. As a result, a traditional media-over-IP production facility can provide the timing mechanisms required for the multicast production media flows, such as Precision Time Protocol (PTP) for example, and can manage the bandwidth, control, and routing for the multicast streams. This comprehensive control over management of the production media flows is commonly known as the Software Defined Network Orchestration (hereinafter "SDNO").

SUMMARY

Embodiments presented in this disclosure provide a computer-implemented method, a non-transitory computer-readable medium, and a system to perform an operation to manage media flows for broadcast with public cloud networks. The operation includes receiving, from a requesting entity and by a receiving entity, a request for a media flow. The operation also includes identifying a location of the media flow based on a registration database configured to maintain locations of media flows across a media production facility and a public cloud network facility. The operation also includes accessing the media flow. At least one of the receiving entity or the requesting entity is configured to generate media based on the media flow.

BRIEF DESCRIPTION OF THE DRAWINGS

So that the manner in which the above recited aspects are attained and can be understood in detail, a more particular description of aspects described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
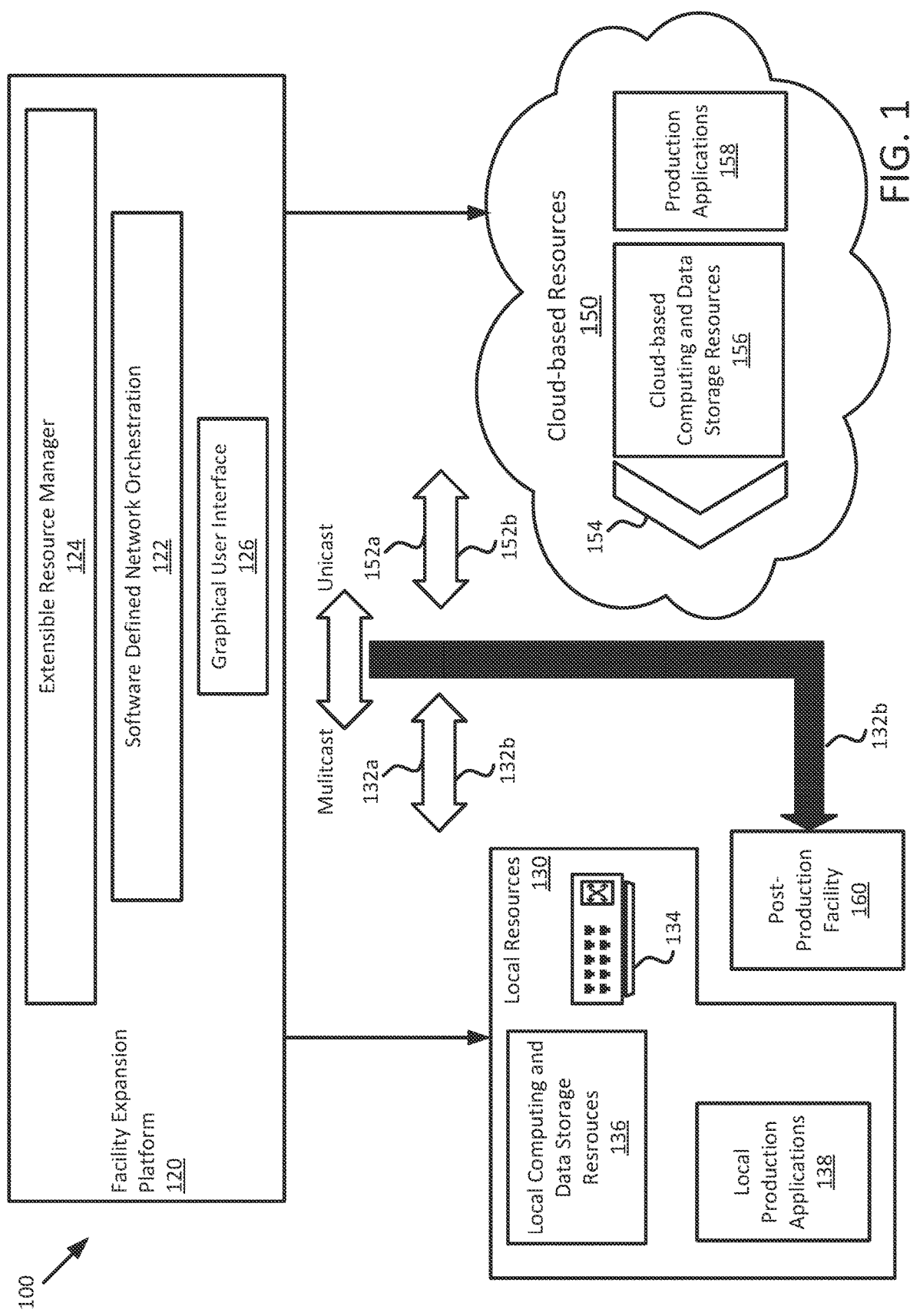
FIG. 1 illustrates an exemplary cloud-extensible media production system, according to aspects of the present disclosure

The present disclosure provides a hybrid production environment that uses an SDNO or other orchestration layer to manage media flows for broadcast with public cloud networks with greater resource scalability, more efficient bandwidth usage, and more efficient control of assets, among other benefits. The hybrid production environment described herein allows operators to seamlessly produce media using media flows located at various different facilities including locally accessible media flows and media flows originating in cloud network facilities. To allow media production (i.e., the assembly, insertion of a variety of elements, addition of effects, overlaying of audio, etc. in real time) when using a public cloud network, the media flows are made navigable within the cloud network. A management system for navigating such media elements ensures that media flows at various on-site and off-site locations can be accessed and retrieved reliably and quickly for the production of media in real, or near-real, time.

In contrast to on-premises computing environments, cloud-based computing environments, whether public or private, typically do not allow for multicast transmission (using a multicast group identifier to send communications to a multicast group that zero to many devices may subscribe to) due in part to the unpredictable demands that multicast signals can place on bandwidth within the cloud network. Instead, users of cloud-based IT resources are typically allocated (in addition to the computing and storage processes used/reserved) ingress or egress bandwidth for access to the cloud network, which they are also billed or allocated for unicast transmissions. However, the simultaneous delivery of large amounts of data (e.g., via several unicast transmissions) to each of a large number of delivery platforms will exhaust the capability of even a high bandwidth network. The bandwidth usage associated with using several unicast streams poses a major scalability issue for applications which require sustained high bandwidth.

As broadcast media flows originating from various facilities at various locations in an IP multicast travel to the cloud network provider, the media management system ensures that the media flows undergo low-latency compression, migrate from multicast to unicast for entering the cloud network, are aggregated together cohesively, and are placed with a common carrier for transmission to the cloud provider's facility. Similarly, in reverse, as broadcast media flows (or elements thereof) are retrieved from the cloud network provider, the media management system ensures that the selected media flows are retrieved from the cloud provider's facility via the common carrier, are migrated from unicast to multicast, and undergo low-latency decompression for consumption at one or more facilities. The media management system identifies each individual media flow uniquely (along with the associated statuses and contents) by tracking the flows as the flows traverse the various networks used. Accordingly, the media management system provides operators an understanding of what source flows are available from and direct the usage thereof to produce a media flow for broadcast. Additionally, the media management system can tally (i.e., identify as being "on air"), discover, register, map, etc., the media flows to allow parallel productions to use the various media flows at the same or different time, across various local and cloud production workflows.

Although the traffic described herein is primarily discussed as being compressed for transmission over the common carrier (e.g., for bandwidth efficiency), in some aspects, the traffic carried by the common carrier is left uncompressed. Accordingly, a facility transmitting such traffic omits a compression operation and a facility receiving the uncompressed data does not need to decompress the traffic, which advantageously may allow faster access to the data than if compression and decompression operations were applied.

FIG. 1 illustrates an exemplary cloud-extensible media production system 100, according to aspects of the present disclosure. As shown in FIG. 1, cloud-extensible media production system 100 includes a local production facility (represented by the local resources 130) interactively linked with a cloud-based environment (represented by the cloud-based resources 150). As shown in FIG. 1, a local production facility includes local resources 130 generating multicast production media flows 132a and that are communicatively coupled to facility expansion platform 120. The local resources 130 include a local physical production network 134, local computing and data storage resources 136, and local production applications 138. In addition, FIG. 1 shows an SDNO 122 and an ERM 124 hosted by facility expansion platform 120, and graphical user interface (GUI) 126 providing a production monitoring and/or control dashboard for an optional user of facility expansion platform 120.

The cloud-based virtual production environment includes cloud-based resources 150 that receive and process unicast production media flows 152a corresponding to multicast production media flows 132a, thereby producing post-production unicast media flows 152b. As shown in FIG. 1, cloud-based resources 150 include cloud bandwidth 154, cloud-based computing and data storage resources 156, and cloud-based production applications 158. Also shown in FIG. 1 is physical, i.e., not cloud-based or virtual, post-production facility 160 receiving multicast media flows 132b. It is noted that physical post-production facility 160 may be another production facility similar to local production facility, or may be a media distribution hub, such as a regional affiliate or other affiliated media distributor. It is further noted that multicast media flows 132b may correspond to unicast production media flows 152a after unicast production media flows 152a are processed to produce post-production unicast media flows 152b, and post-production unicast media flows 152b are converted to multicast media flows 132b. Unicast production media flows 152a are processed and post-production unicast media flows 152b are converted using cloud-based virtual production environment.

The cloud-extensible media production system 100 provides an exemplary framework by which the local production facility can up-scale or down-scale per production needs by expanding into cloud-based virtual production environment accordingly. The SDNO 122 extends the local production facility into the cloud-based virtual production environment to manage multicast and unicast production media flows 132a, 152a, create a virtual network managing the bandwidth and allocation of unicast production media flows 152a, as well as announcing and discovering of cloud-based resources 150. In other words, the SDNO 122 identifies and reserves the cloud-based resources 150 for required production processes and manages the connections. In one aspect, this would be accomplished by the cloud vendors providing standard application programming interfaces (APIs) to cloud-based resources 150. The ERM 124 is hosted by facility expansion platform 120 to manage/reserve cloud-based resources 150 required by the media workflows, spinning up computing and storage processes as needed, and loading the required applications. The ERM 124 can additionally manage the licenses for the applications, should additional applications be required. ERM management of cloud-based resources 150 and licensing may be API based such that the ERM 124 can present a media based dashboard to a user via GUI 126, while allocating the appropriate resources from the cloud provider.

In public cloud environments, the cloud host provider may work with the media applications, the SDNO 122 and the ERM 124 to present a user in a local production facility with a hybrid (but apparently seamless) production environment. Standards and specifications such as Networked Media Open Specifications (NMOS) that define the methods for discovery, bandwidth reservation, and the like can be used to establish the framework to create this hybrid architecture, and enable the ERM 124 and the SDNO 122 to establish the features required for a dynamic environment.

As a result, the SDNO 122 and ERM 124 present the user with a seamless environment where asset management for resources are located (e.g., at the local production facility or in the cloud-based virtual production environment).

Figure 2:
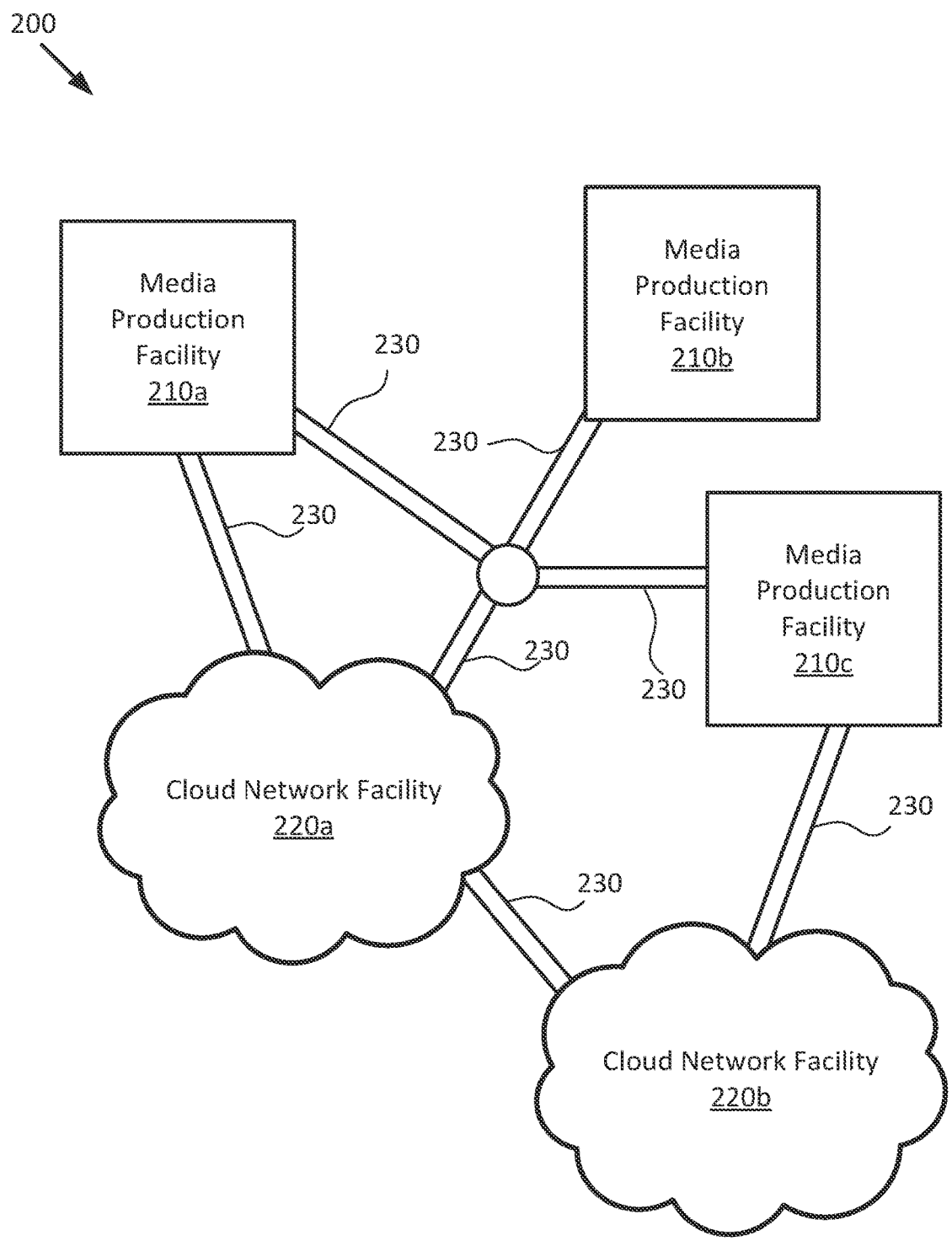
FIG. 2 illustrates a transmission environment, according to aspects of the present disclosure.

FIG. 2 illustrates a transmission environment 200, according to aspects of the present disclosure. Depending on the physical locations of the various facilities producing, storing, transmitting, and otherwise accessing media flows, different pathways can link the separate locations that are geographically distinct from one another (e.g., located in different buildings, on different campuses, in different cities, etc.). For example, one or more media production facilities 210a-c (generally, media production facility 210) at different physical sites from one another can be linked with one another and one or more cloud network facilities 220a-b (generally, cloud network facility 220) via a common carrier 230 (e.g., a telecommunications exchange). The common carrier 230 provides transmission pathways, switches, hubs, etc., to transmit data between different locations, and may include hardware managed by several different operators (e.g., internet service providers, backhaul providers, and backbone network providers).

Within a given media production facility 210, an operator has control over how media flows are managed and transmitted, but when a media flow leaves the media production facility 210, the operator of the other facilities/resources (e.g., a second production facility 210, a cloud network facility 220, and/or a common carrier 230) gain at least partial control over how the media flow is handled. For example, when the operator of a media production facility 210 transmits a media flow outside of the media production facility via a common carrier 230, the operator of the common carrier 230 can aggregate, route, and schedule transmission of data over wired or wireless communications channels (e.g., copper cables, fiber optic cables, satellite or terrestrial signaling channels) under the control of the common carrier 230. Similarly, when an operator of a cloud network facility 220 receives a media flow, the cloud network facility 220 controls what physical device the media flow is stored on (and retrieved from), how the media flow is stored/retrieved, and how the media flow is aggregated with other files and data. Additionally, as a cloud network facility 220 can provide cloud computing services to several different clients (e.g., as a public cloud network), the operator of the cloud network facility 220 may encrypt data so that two parties with data on the same computing device (or running virtual machines on the same computing device) cannot access one another's data or services.

The traffic carrying the media flows move between the facilities in real-time as streams. These streams may be directed to various destinations, and may be requested by several users at different locations for manipulation or inclusion in other media flows. A given media flow may be requested by several different users located at different production facilities 210 while also being sent to the cloud network facility 220 (or several such cloud network facilities 220) simultaneously. For example, a news feed may originate from the first production facility 210a and be modified at a second production facility 210b and at a third production facility 210c while in transit to a cloud network facility 220. Although in a multicast environment several devices may subscribe to a feed to receive the media flow in the "home" environment, in a unicast environment (such as the common carrier 230 and cloud network facilities 220), the individual unicast flows need to be managed to ensure that the requesting devices receive the appropriate media flows, regardless of the physical locations of those requesting devices or the media flows.

Figure 3:
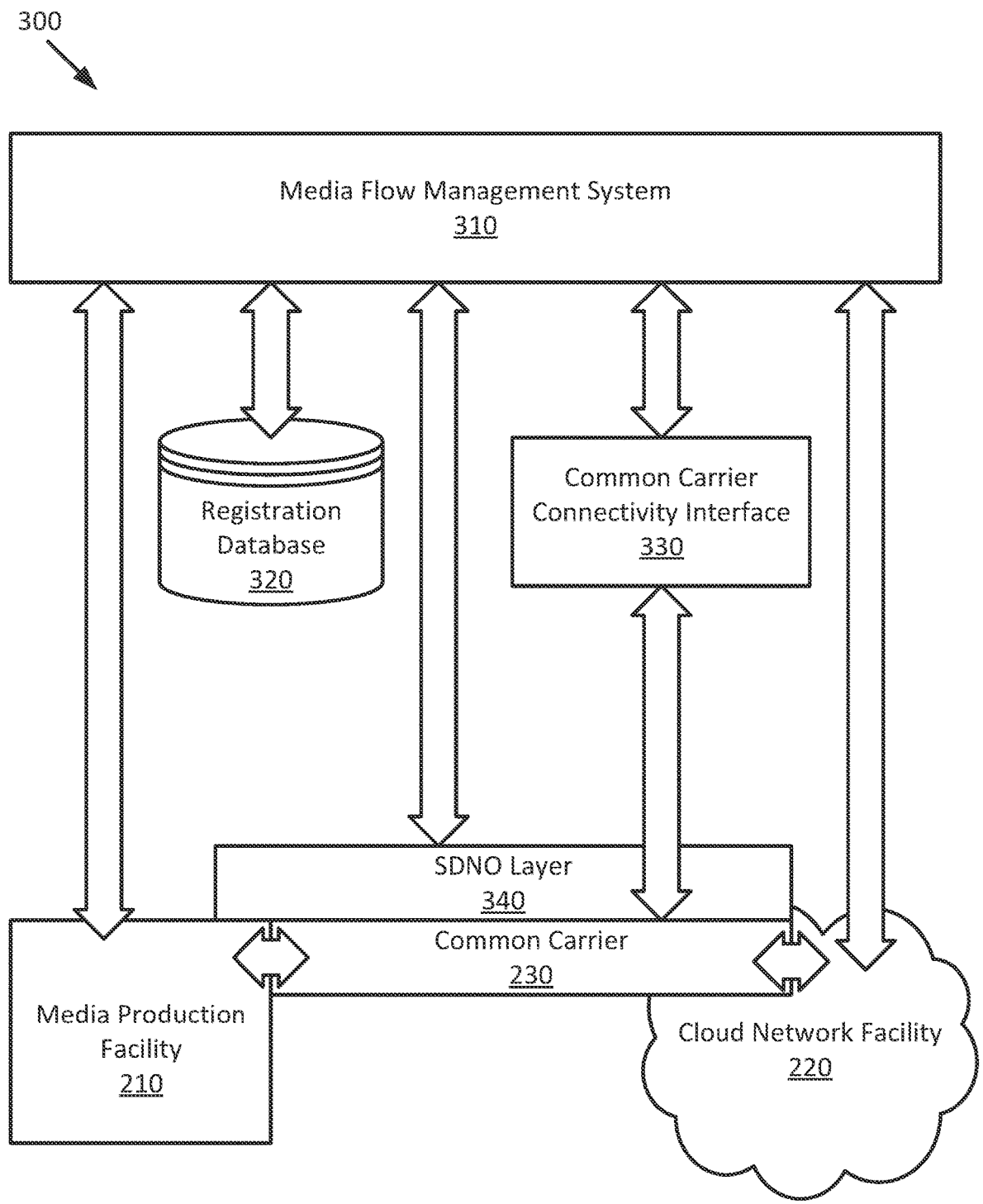
FIG. 3 illustrates an orchestration management schema, according to aspects of the present disclosure.

FIG. 3 illustrates an orchestration management schema 300, according to aspects of the present disclosure, to provide the management of unicast media flows to ensure that the requesting devices receive the appropriate media flows, regardless of the physical locations of those requesting devices or the media flows. The orchestration management schema 300 provides a true hybrid production environment that uses SDNO to manage media flows for broadcast when using a public cloud network in conjunction with local media production management practices, by making the media flows navigable throughout the distribution network. A media flow management system (MFMS) 310 ensures that media flows located at various on-site and off-site locations can be accessed and retrieved reliably and quickly for the production of media in real, or near-real, time by production devices located at various media production facilities 210 or operating cloud-based software packages in a cloud network facility 220.

The MFMS 310 is in communication with a registration database 320 that stores information for where a given media flow is located as well as various features of the media flow. For example, a media flow can include various video segments, audio segments, graphics (still or animated), content triggers (e.g., identifying when another media flow can begin), content metadata describing contents of the media flows (e.g.: running times; file formats; descriptors of the locations, persons, or subjects included in the media; etc.); and/or usage metadata describing how the media flows have been used or broadcast (e.g., tallies indicating current or live broadcast, counts of previous broadcasts, locations/station identifiers that used the media flow, etc.). The registration database 320 can include an identifier for the media flow, various metadata regarding the media flow, and/or a storage location of the media flow (e.g., at a given media production facility 210, at a given cloud network facility 220, on a given common carrier 230). The information held in the registration database 320 enables users of the MFMS 310 to locate and access the media flows at various facilities to thereby edit, consume, reorder, combine, split, or otherwise manipulate the data of the media flows as though the media flows were stored and controlled locally to the user.

To ensure that the information held in the registration database 320 is accurate and up-to-date as media flows pass between various facilities, the MFMS 310 is in communication (via various Application Program Interfaces (APIs)) with the media production facility(s) 210, the cloud network facility(s) 220, the common carrier(s) 230 via a common carrier connectivity interface 330, and an SDNO layer 340. The common carrier connectivity interface 330 can be provided as an API providing intercommunication between the MFMS 310 and the common carrier 230. The MFMS 310 updates the registration database 320 based on the status of the media flow changes. For example, when multiple media flows are combined, (e.g., a graphic is overlaid onto a video segment), the MFMS 310 registers the combination and/or the creation of a new combined media flow. Media flows are combined in common carriers 230 for increasing transmission efficiency (similarly to multiplexing in satellite transmission), and two (or more) media flows can be combined for transmission regardless of whether the individual media flows are related to one another. For example, a first media flow of a news feed and a second media flow of a sports broadcast (which might not ever be broadcast together) can be combined together to share a signaling path over the common carrier 230.

In a further example, when a media flow that is stored is requested for broadcast (e.g., a media flow is pre-produced and stored before distribution to end consumers), the MFMS 310 indicates via a tally that the given media flow is being used, and that the given media flow is to be protected from deletion and should be carefully edited (if at all) until the tally is removed (e.g., when broadcast concludes).

As media flows originating from various media production facilities 210 are generated and placed onto the common carrier 230 for transmission to a cloud network facility 220 or as media flows stored outside of the media production facilities 210 are requested for retrieval or manipulation from the cloud network facility 220, the MFMS 310, via the SDNO layer 340, ensures that the media flows undergo the proper conversions for use of the media flow in the destination facility. For example, when leaving the media production facility 210, the SDNO layer 340 may apply a low-latency compression to the media flow, migrate the media flows from multicast to unicast, and place the media flows with the common carrier 230 from the real-time network in the media production facility 210 for transmission to the cloud network facility 220. In reverse, when returning to the media production facility 210 from the cloud network facility 220, the SDNO layer 340 migrates the media flows from unicast to multicast and removes the low-latency compression from (i.e., decompresses) the media flow. In some aspects, the SDNO layer 340 also ensures that media flows are cohesively aggregated together (e.g., with similar or related media flows) into a bundled media flow when exiting the media production facility 210 and are properly extracted and/or disseminated from a bundled media flow received back to the media production facility 210. The SDNO layer 340 ensures that regardless of where the media flow is located, that the media flow is addressable and locatable by a user for use in broadcast or in producing additional media flows.

The MFMS 310 identifies each individual media flow uniquely via a key value or unique identifier in the registration database 320 (along with the associated statuses and contents), and tracks the media flows traversing the various networks and facilities in the registration database 320. In various embodiments, the unique identifier associated with the media flow is intelligently assigned based on the nature of the media flow, where the media flow was generated, etc., to aid in human interpretation of the media flows (e.g., TV2CAM3, WASHFEED1, LONDFEED6). The MFMS 310 provides these tracking data to operators, indicating the availability of various media flows for use in producing a broadcast.

Figure 4:
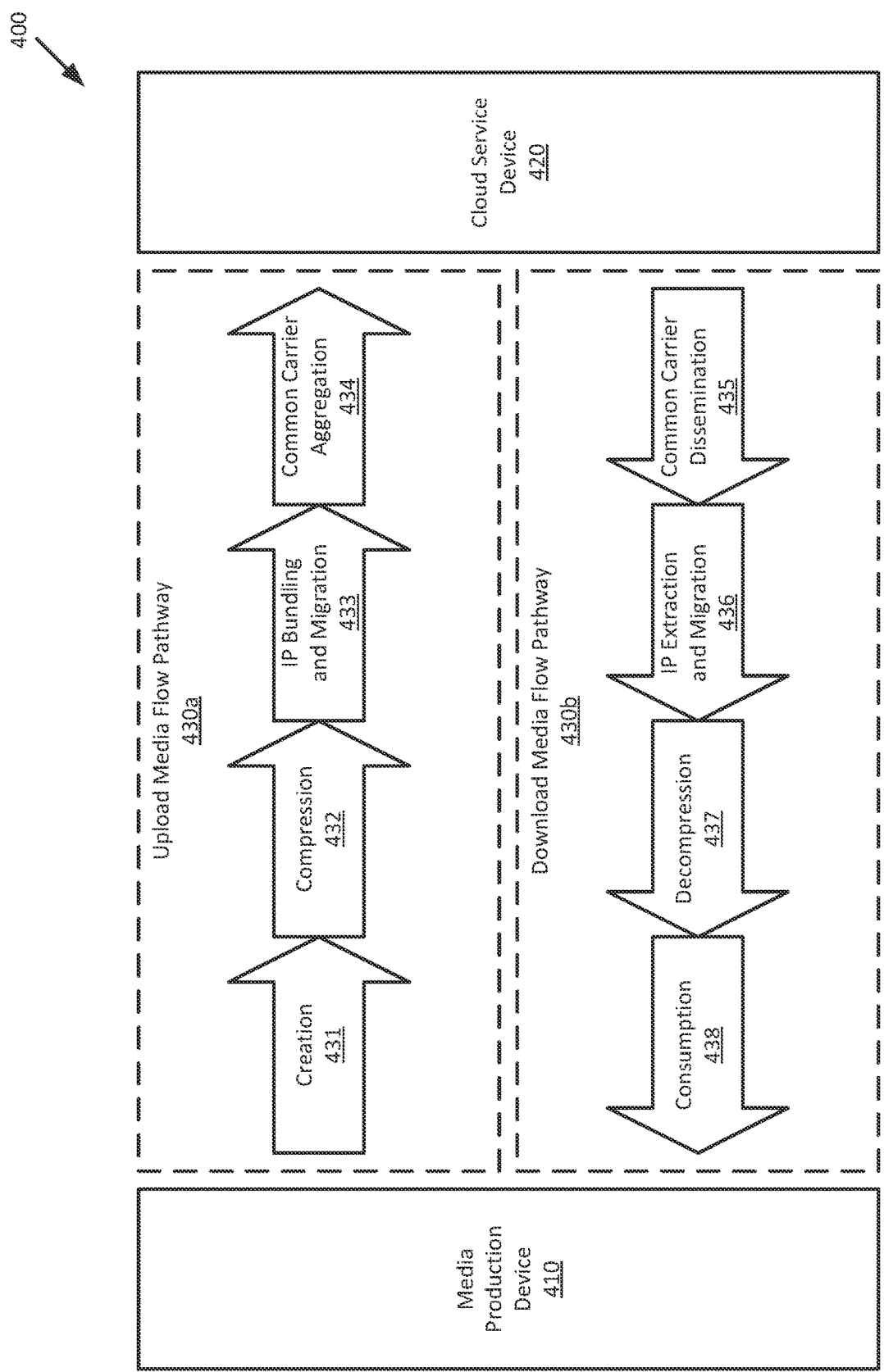
FIG. 4 illustrates processing pathways for media flows between different facilities, according to aspects of the present disclosure.

FIG. 4 illustrates processing pathways 400 for media flows between different facilities, according to aspects of the present disclosure. The processing pathways 400 are bi-directional, as data flows to or from the media production facilities 210 and to or from the cloud network facilities 220, but for purposes of clarity, are discussed herein as a separate upload media flow pathway 430*a* and download media flow pathway 430*b* (generally, media flow pathway 430). A media flow pathway 430 is processed by various physical networking devices (e.g., switches, routers, head ends, electrical-to-optical signal converters, optical-to-electrical signal converters, etc.) managed in the media production facility 210, the cloud network facility 220, and the common carrier 230 by the respective operators. One of ordinary skill in the art will therefore appreciate that each of the unidirectional media flow pathways 430*a*, 430*b* may be understood independently or in conjunction with one another to describe a bidirectional media flow pathway 430 to and from the various facilities discussed in the present disclosure.

In the upload media flow pathway 430*a*, a media production device 410 located at a media production facility 210 creates a media flow (per block 431) that is transmitted to a cloud service device 420 at a cloud network facility 220 via the common carrier 230. The cloud service devices 420 include computing devices (e.g., providing Software as a Service or Platform as a Service functionality to remote users) and storage devices for holding data for later retrieval and/or manipulation. Because the traffic are sent and handled as real-time flows (e.g., streams), storage can include caching or buffering the data for further transmission within the cloud network facility 220 and/or spooling the data to longer term storage (with an associated unspooling for retrieval).

Before exiting the network of the media production facility 210, the SDNO layer 340 compresses the media flow (per block 432), which reduces the bandwidth requirements to transmit the media flow over the common carrier 230 and the storage requirements on the cloud service device 420. In some aspects, the compression can also include encryption to keep the media flow private. Once the media flow is compressed, SDNO layer 340 bundles and migrates the media flow (per block 433), in which the media flow migrates from a multicast media flow (as used in the media production facility 210) to a unicast media flow (as used in the cloud network facility 220) and may be aggregated with one or more other media flows for transmission to the cloud network facility 220 over the common carrier 230). The common carrier 230 may aggregate (per block 434) traffic from one or more sources to manage network resources for transmitting data for various parties to the cloud service device 420.

In the download media flow pathway 430*b*, a media flow stored on the cloud service device 420 is accessed by a media production device 410 located at a media production facility 210 and is transmitted to the media production device 410 via the common carrier 230. The common carrier 230 disseminates (per block 435) the media flow stored by the cloud service device 420 over the network to the media production facility 210. Once the media production facility receives the media flow, SDNO layer 340 (optionally) extracts the requested media flow from any other media flows in which the requested media flow is bundled in or with, and migrates (per block 436) the media flow from being a unicast media flow to being a multicast media flow. The multicast media flow may designate a destination multicast group that the media production device 410 that requested access to the requested media flow belongs to, or may designate a different destination multicast group for the migrated multicast media flow. The SDNO layer 340 decompresses and/or decrypts the migrated media flow (per block 437), and provides the media flow to the members of the designated multicast media group for consumption (per block 438). In various aspects, consumption includes the broadcast transmission of the media flow (e.g., over the air, via a cable or satellite television system), the use of the media flow with another specified media flow (e.g., overlaying or being overlaid by the other media flow), adding additional content to the media flow (e.g., appending additional footage to a video segment), editing the media flow (e.g., removing footage from a video segment, changing mixing level in an audio clip, altering a graphic), and/or the like.

Figure 5:
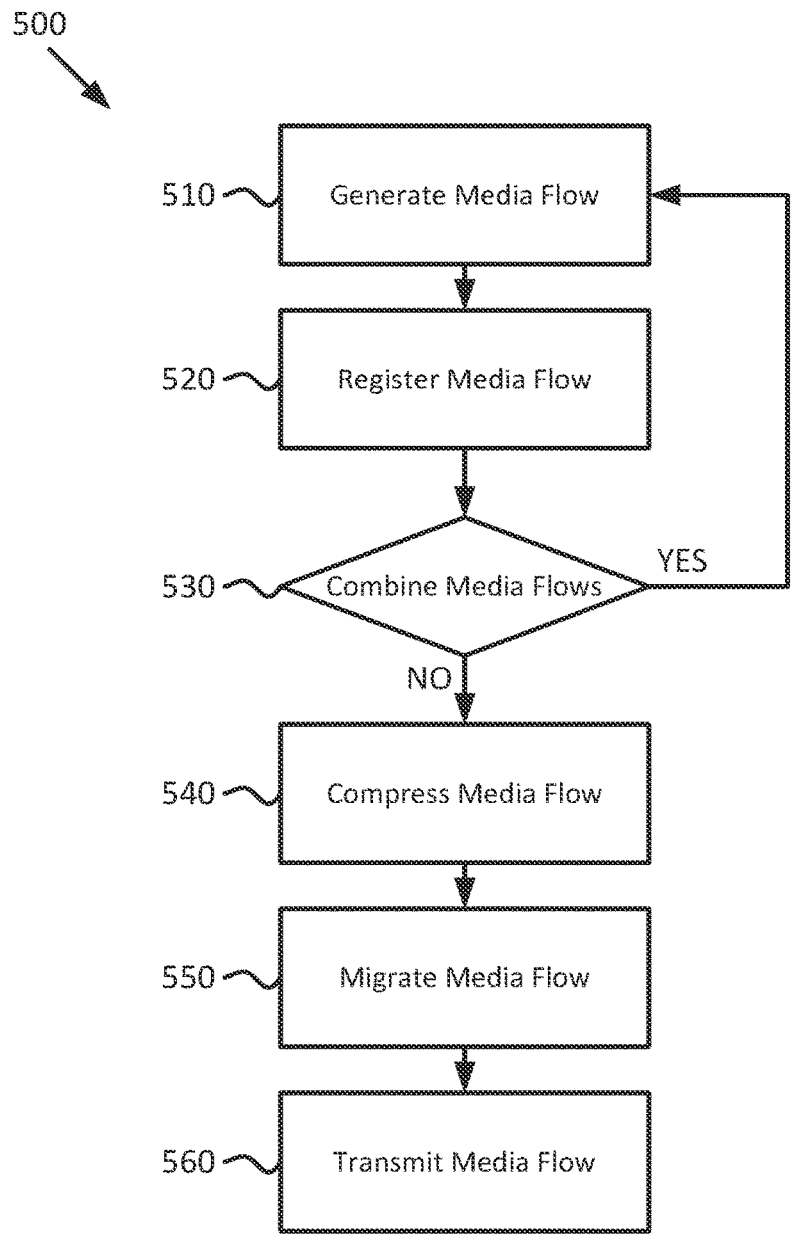
FIG. 5 is a flowchart of a method for handling media flows, according to aspects of the present disclosure.

FIG. 5 is a flowchart of a method 500 for handling media flows, according to aspects of the present disclosure. Method 500 begins at block 510, where a media production device 410 generates or receives an as-of-yet unregistered media flow (generally, identifying a media flow for multicast transmission). Media flows include various content that are used (or are available for use) in the production of media including television programming, streaming video on demand (SVOD), live streaming, etc., such as, for example, video segments, audio segments, graphics, content triggers, and the like. Media flows are generated in media production facilities 210, and are shared or made available for sharing within the media production facility to several media production devices 410 as a multicast media flows. Multicast media flows, when transmitted, are addressed to zero or more devices belonging to a multicast group identified in a transmission of the media flow.

At block 520, in response to generating a media flow (or receiving a previously generated media flow that is not-yet registered), a MFMS 310 registers the media flow in a registration database 320. Registration with the registration database 320 uniquely identifies the media flow from other media flows, and stores various metadata related to the media flow so that an operator can later identify, retrieve, and/or manipulate the media flow in a production environment that extends seamlessly across one or more media production facilities 210 and cloud network facilities 220. The metadata may include one or more of: a current location where the media flow is stored, whether the media flow is currently being used in a broadcast to end consumers (e.g., a tally), what other media flows are stored with or are being used with the identified media flow, what entities (as well as when and where) have previously used the media flow, etc.

At block 530, the MFMS 310 or the media production device 410 may combine two or more media flows together into a combined media flow or a bundled media flow. For example, the media production device 410 may identify in an insertion command a first media flow to overlay (or be overlaid by) a second media flow, a first media flow to sync with a second media flow (e.g., an audio segment to play with a video segment), a first media flow to append to or splice within a second media flow, etc., to generate a combined media flow that includes the two media flows. In a further example, the MFMS 310 may identify two or more media flows that are combined based on one or more shared features to cohesively transmit and store related media flows (e.g., two or more graphics for a shared subject matter, aggregated to provide a graphics package) in a bundled media flow.

The MFMS 310 can combine two or more media flows regardless of where the media flows are located in the transmission environment 200. For example, the MFMS 310 can combine two media flows located at: the same production facility 210, at different production facilities 210, at a production facility 210 and a cloud network facility 220, at the same cloud network facility 220, at different cloud network facilities 220, at a production facility 210 and on the common carrier 230, at a cloud network facility 220 and the common carrier 230, or both on the common carrier 230. When two or more media flows are combined, method 500 returns to block 510, as a new media flow has been generated, otherwise, method 500 proceeds to block 540.

At block 540, when the media flow leaves the media production facility 210 (either for storage in a cloud network facility 220 or another media production facility 210), the media flow is compressed. Compression decreases the amount of space needed to store the media flow and reduces the bandwidth needed to transmit the media flow. In some aspects, compression can also include encryption of the media flow.

At block 550, the MFMS 310 migrates the media flow from a multicast flow to a unicast flow. In various embodiments, the migration changes the multicast group identifier to the IP address of the cloud network facility 220 or the media production device 410 at a remote media production facility 210 that the media flow is being sent to via the common carrier 230.

At block 560, the media production facility 210 transmits the media flow over the common carrier 230 to the cloud network facility 220 or another (remote) media production facility 210. The MFMS 310 monitors the media flow over the common carrier 230 and at the destination facility, via the SDNO layer 340, and updates the registration database 320 as the media flow is modified, combined with other media flows, re-stored, and as additional media flows are generated that include the media flow.

Figure 6:
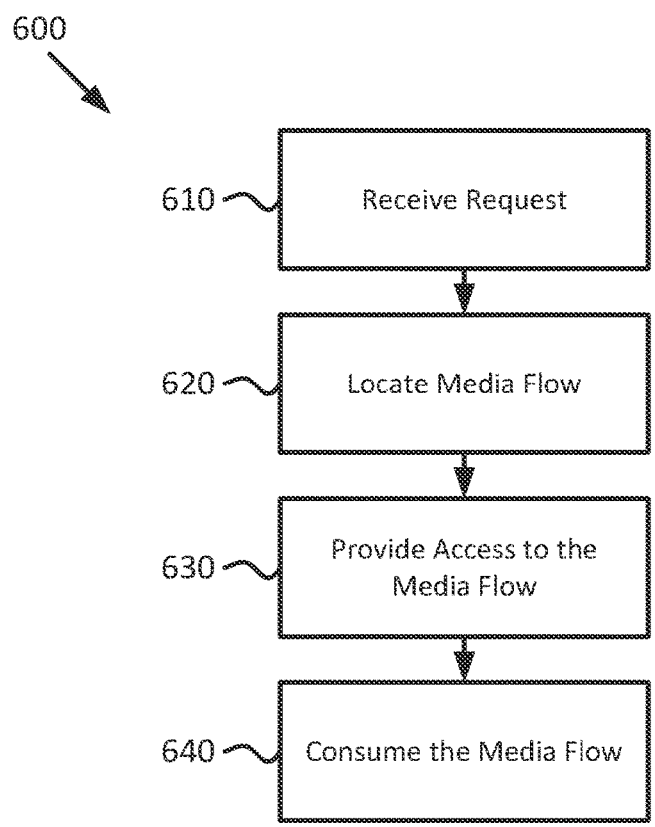
FIG. 6 is a flowchart of a method for accessing media flows, according to aspects of the present disclosure.

FIG. 6 is a flowchart of a method 600 for accessing media flows, according to aspects of the present disclosure. Method 600 begins with block 610, where a MFMS 310 receives a request for a media flow. At block 620, the MFMS 310 queries the registration database 320 to identify where the media flow is stored, and whether the requested media flow is included within a combined or bundled media flow.

At block 630, the MFMS 310 provides access to the media flow to the requesting user. Stated differently, the user receives access to the requested media flow via the MFMS 310, which facilitates access to the media flow regardless of the current location of the media flow being in the (local) media production facility 210 of the requesting user, a different (remote) media production facility 210, or a cloud network facility 220. When the media flow is located in the local media production facility 210 of the user, the MFMS 310 can add the media production device 410 of the requesting user to the multicast group for the media flow, or provide the multicast group identifier to the media production device 410 to add itself to the multicast group to receive the media flow. When the media flow is located at a remote media production facility 210, the MFMS 310 manages transmission of the media flow over a common carrier 230 between the two facilities (including compressing, migrating, unmigrating, and decompressing at the facilities). When the media flow is located in a cloud network facility 220, the MFMS 310 retrieves the media flow as a unicast flow, manages transmission back to the media production facility 210 over the common carrier 230 and migrates the unicast flow to a multicast flow for consumption within the media production facility 210. In various aspects, providing access to the media flow includes decompression and/or decrypting the media flow.

In some aspects, when the requested media flow is included in a bundled media flow with one or more other media flows, providing access to the media flow includes extracting the requested media flow from the other media flows included in the bundled media flow. In some aspects, the non-requested media flows are also retrieved and unbundled for review by the user.

At block 640, the media production device 410 consumes the requested media flow. Consuming the media flow can include editing the media flow and/or combining two or more media flows into one combined media flow (e.g., overlaying a graphic on a video segment). When consuming the media flow includes broadcasting the media flow to end consumers, the MFMS 310 updates the registration database 320 to tally the media flow (indicating that the media flow is being used in an ongoing broadcast and is unavailable to edit or is in a state protected from deletion and marked for care in editing).

Figure 7:
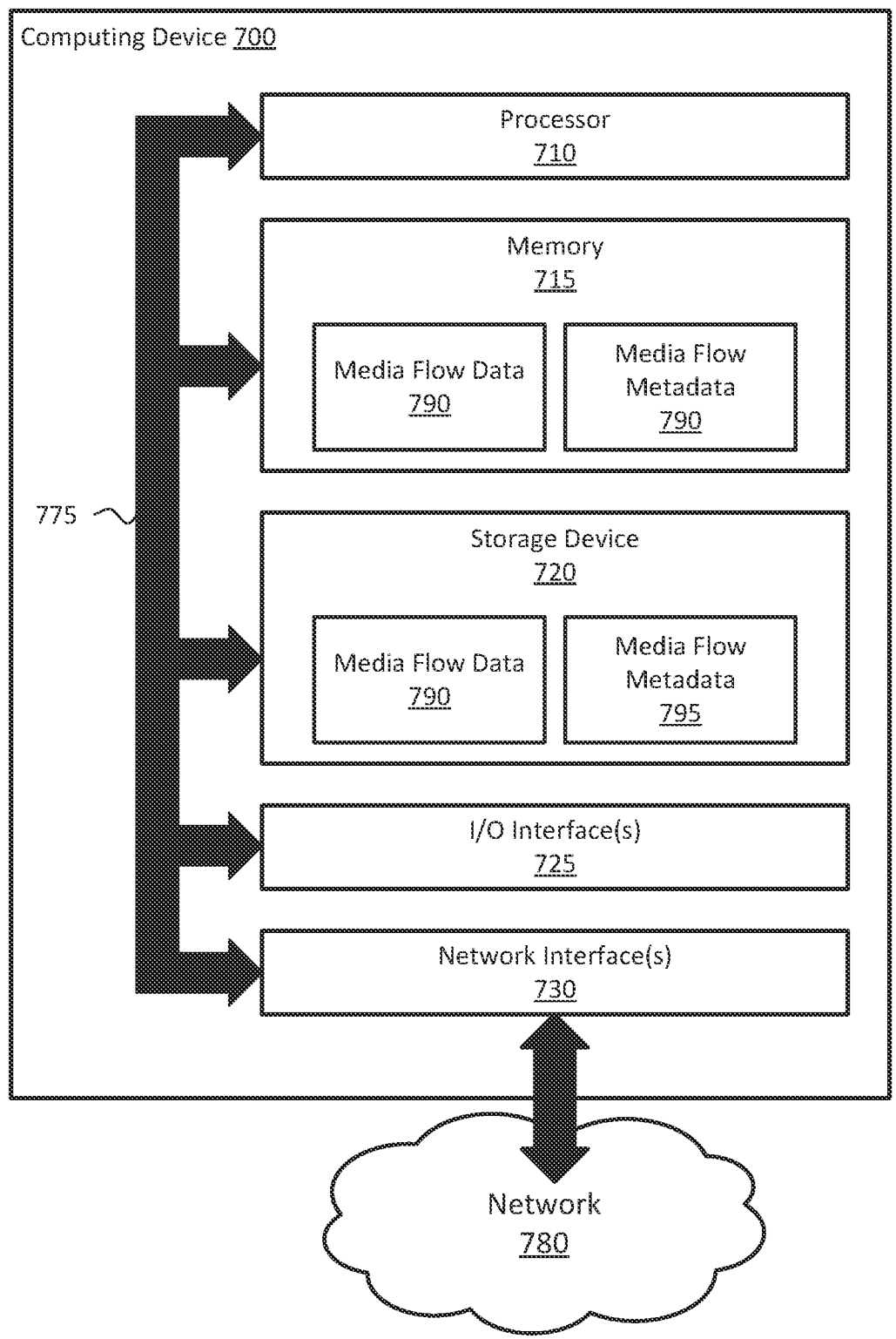
FIG. 7 illustrates a computing device, according to aspects of the present disclosure.

FIG. 7 illustrates a computing device 700, such as may be used as a media production device 410, cloud service device 420, or other computing system described or referenced herein, according to aspects of the present disclosure. Although depicted as one physical device, in some aspects, the computing device 700 may be implemented as a virtual device or service, and/or across a number of devices (e.g., in a cloud environment). As illustrated, the computing device 700 includes a processor 710, memory 715, storage device 720, a network interface 730, and one or more Input/Output (I/O) Interfaces 725. The processor 710 retrieves and executes programming instructions stored in the memory 715, as well as stores and retrieves application data residing in the storage device 720. The processor 710 is generally representative of a single Central Processing Unit (CPU) and/or Graphical Processing Unit (GPU), multiple CPUs and/or GPUs, a single CPU and/or GPU having multiple processing cores, and the like. The memory 715 is generally included to be representative of a Random Access Memory (RAM). The storage device 720 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some aspects, input and output devices (such as a mouse, a keyboard, a monitor, a touchscreen, etc.) are connected via the I/O interface(s) 725. Further, via the network interface 730, the computing device can be communicatively coupled with one or more other devices and components (e.g., via the network 780, which may include the Internet, local network(s), and the like). Additionally, the network 780 may include wired connections, wireless connections, or a combination of wired and wireless connections. As illustrated, the processor 710, memory 715, storage device 720, I/O interface(s) 725, and network interface(s) 730 are communicatively coupled by one or more buses 775.

The computing device 700 can locally store media flow data 790 and/or media flow metadata 795 in the memory 715 (e.g., for generation and modification) and/or in the storage device 720, and may access remotely stored media flow data 790 and/or media flow metadata 795 stored by another computing device 700 via the network interface(s) 730 and the network. Although not illustrated, the memory 715 and the storage device 720 may also store one or more applications, operating systems, APIs, which may be stored as various computer readable instructions that are executed by the processor 710 to perform the various operations described in the present disclosure.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions or over the prior art, whether or not a particular advantage is achieved by a given aspect is not limiting of the present disclosure. Thus, the aspects, features, embodiments, and advantages disclosed herein are merely illustrative and are not considered elements or limitations of the appended claims except where explicitly recited in a claim (s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to aspects of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A computer-implemented method comprising:
   identifying, using a registration database having a plurality of media flows registered therein, a first location of a first media flow of the plurality of media flows and a second location of a second media flow of the plurality of media flows, the registration database configured to uniquely identify each of the of the plurality of media flows and store respective metadata related to each of the of the plurality of media flows, the respective metadata including: (i) a respective location of each of the plurality of media flows across a media production facility and a public cloud network facility, (ii) whether each of the plurality of media flows is currently being used in a broadcast, and (iii) what other media flows are stored with or are being used with each of the plurality of media flows;
   accessing the first media flow from the first location identified in the registration database, wherein the first location of the first media flow is in the public cloud network facility;
   accessing the second media flow from the second location identified in the registration database;
   generating media by combining the first media flow with the second media flow to provide a combined media flow in real time with respect to identifying the first location of the first media flow and the second location of the second media flow; and
   registering the combined media flow in the registration database by uniquely identifying the combined media flow in the registration database and storing metadata related to the combined media flow in the registration database.

2. The computer-implemented method of claim 1, further comprising, in response to identifying that the first location of the first media flow is in the public cloud network facility:
   retrieving, to the media production facility, the first media flow from the public cloud network facility as a unicast flow; and
   migrating, within the media production facility, the unicast flow to a multicast flow for use in generating the media.

3. The computer-implemented method of claim 2, wherein the multicast flow is compressed, and wherein the computer-implemented method further comprises decompressing the multicast flow.

4. The computer-implemented method of claim 1, wherein the first media flow includes at least one of:
   a graphic;
   a video segment;
   an audio segment; or
   a content trigger.

5. The computer-implemented method of claim 1, wherein the media is transmitted to a device of an end consumer.

6. A non-transitory computer-readable medium containing instructions executable to perform an operation comprising:
   identifying, using a registration database having a plurality of media flows registered therein, a first location of a first media flow of the plurality of media flows and a second location of a second media flow of the plurality of media flows, the registration database configured to uniquely identify each of the of the plurality of media flows and store respective metadata related to each of the of the plurality of media flows, the respective metadata including: (i) a respective location of each of the plurality of media flows across a media production facility and a public cloud network facility, (ii) whether each of the plurality of media flows is currently being used in a broadcast, and (iii) what other media flows are stored with or are being used with each of the plurality of media flows;
   accessing the first media flow from the first location identified in the registration database, wherein the first location of the first media flow is in the public cloud network facility;
   accessing the second media flow from the second location identified in the registration database;
   generating media by combining the first media flow with the second media flow to provide a combined media flow in real time with respect to identifying the first location of the first media flow and the second location of the second media flow; and
   registering the combined media flow in the registration database by uniquely identifying the combined media flow in the registration database and storing metadata related to the combined media flow in the registration database.

7. The non-transitory computer-readable medium of claim 6, wherein the operation further comprises, in response to identifying that the first location of the first media flow is in the public cloud network facility:
   retrieving, to the media production facility, the first media flow from the public cloud network facility as a unicast flow; and
   migrating, within the media production facility, the unicast flow to a multicast flow for use in generating the media.

8. The non-transitory computer-readable medium of claim 7, wherein the multicast flow is compressed, and wherein the operation further comprises decompressing the multicast flow.

9. The non-transitory computer-readable medium of claim 6, wherein the first media flow includes at least one of:
   a graphic;
   a video segment;
   an audio segment; or
   a content trigger.

10. A system comprising:
    one or more computer processors configured to perform an operation comprising:
       identifying, using a registration database having a plurality of media flows registered therein, a first location of a first media flow of the plurality of media flows and a second location of a second media flow of the plurality of media flows, the registration database configured to uniquely identify each of the of the plurality of media flows and store respective metadata related to each of the of the plurality of media flows, the respective metadata including: (i) a respective location of each of the plurality of media flows across a media production facility and a public cloud network facility, (ii) whether each of the plurality of media flows is currently being used in a broadcast, and (iii) what other media flows are stored with or are being used with each of the plurality of media flows;
       accessing the first media flow from the first location identified in the registration database, wherein the first location of the first media flow is in the public cloud network facility;
       accessing the second media flow from the second location identified in the registration database;
       generating media by combining the first media flow with the second media flow to provide a combined media flow in real time with respect to identifying the first location of the first media flow and the second location of the second media flow; and
       registering the combined media flow in the registration database by uniquely identifying the combined media flow in the registration database and storing metadata related to the combined media flow in the registration database.

11. The system of claim 10, wherein the operation further comprises, in response to identifying that the first location of the first media flow is located in the public cloud network facility:
    retrieving, to the media production facility, the first media flow from the public cloud network facility as a unicast flow; and
    migrating, within the media production facility, the unicast flow to a multicast flow for use in generating the media.

12. The system of claim 11, wherein the multicast flow is compressed, and wherein the operation further comprises decompressing the multicast flow.

13. The system of claim 10, wherein the first media flow includes at least one of:
    a graphic;
    a video segment;
    an audio segment; or
    a content trigger.

14. The system of claim 10, wherein the first media flow is accessed via an orchestration layer running in the media production facility and the public cloud network facility over a common carrier.

15. The computer-implemented method of claim 1, wherein the metadata further comprises content metadata describing contents of the first media flow or the second media flow.

16. The non-transitory computer-readable medium of claim 6, wherein the metadata further comprises content metadata describing contents of the first media flow or the second media flow.

17. The system of claim 10, wherein the metadata further comprises content metadata describing contents of the first media flow or the second media flow.

* * * * *